(12) United States Patent  (10) Patent No.: US 8,070,210 B2
Lotz  (45) Date of Patent: Dec. 6, 2011

(54) TRUCK BED ENCLOSURE

(76) Inventor: Douglas B. Lotz, Snohomish, WA (US)

( * ) Notice: Subject to any disclaimer, the term of this patent is extended or adjusted under 35 U.S.C. 154(b) by 351 days.

(21) Appl. No.: 11/895,136

(22) Filed: Aug. 23, 2007

(65) Prior Publication Data

US 2009/0051185 A1 Feb. 26, 2009

(51) Int. Cl.
 *B60R 7/00* (2006.01)
(52) U.S. Cl. ............. 296/100.01; 296/100.09; 296/37.6; 119/453
(58) Field of Classification Search ............. 296/100.01, 296/100.09, 37.1, 37.5, 37.6; 119/496, 453; 224/42.32, 556
 See application file for complete search history.

(56) References Cited

U.S. PATENT DOCUMENTS

| | | | |
|---|---|---|---|
| 4,418,954 A | 12/1983 | Buckley | |
| 4,531,775 A | 7/1985 | Beals | |
| 4,750,773 A | 6/1988 | Chapline | |
| 4,870,925 A * | 10/1989 | Troutman | 119/453 |
| 4,946,217 A | 8/1990 | Steffens | |
| 5,065,699 A * | 11/1991 | Marshall | 119/453 |
| 5,087,093 A | 2/1992 | Repetti | |
| 5,147,103 A | 9/1992 | Ducote | |
| 5,538,316 A | 7/1996 | Bartholomew | |
| D397,082 S * | 8/1998 | Kunkel | D12/406 |
| 5,800,145 A | 9/1998 | Kelce | |
| 5,951,095 A * | 9/1999 | Herndon | 296/165 |
| 6,095,588 A | 8/2000 | Rodosta | |
| 6,499,434 B1 * | 12/2002 | Tyler | 119/453 |
| 6,824,184 B2 | 11/2004 | Leitner | |
| 6,824,190 B1 | 11/2004 | Rogers | |
| 6,978,736 B2 | 12/2005 | Sanford | |
| 7,021,693 B2 | 4/2006 | Keller | |

OTHER PUBLICATIONS 14 photographs provided by the inventor depicting a truck bed kennel boltable to the floor and front of a truck bed. The top of the kennel is not respositionable. The kennel was in public use more than one year prior to the filing date of the present US Patent Application.

* cited by examiner

*Primary Examiner* — Glenn Dayoan
*Assistant Examiner* — Melissa A Black
(74) *Attorney, Agent, or Firm* — Robert A. Jensen; Jensen & Puntigam, P.S.

(57) ABSTRACT

A positionable truck bed enclosure may be mounted on the gunwales of a pickup truck. The enclosure may comprise side panels mountable on the gunwales and a top hinged along one edge and mounted between the side panels. The top may be hinged intermediate its ends to form first and second sections, and control arms connected to the second section may be used to control the position of the lower edge of the second section as the top is raised and lowered.

1 Claim, 8 Drawing Sheets

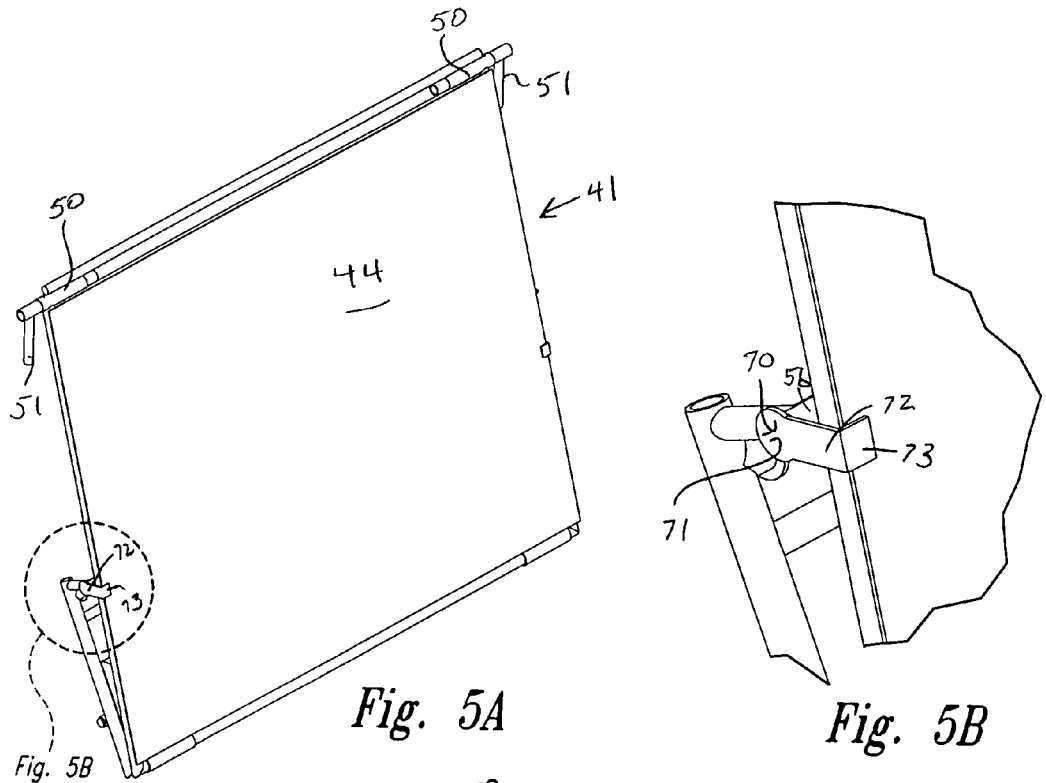
*Fig. 5A*
*Fig. 5B*
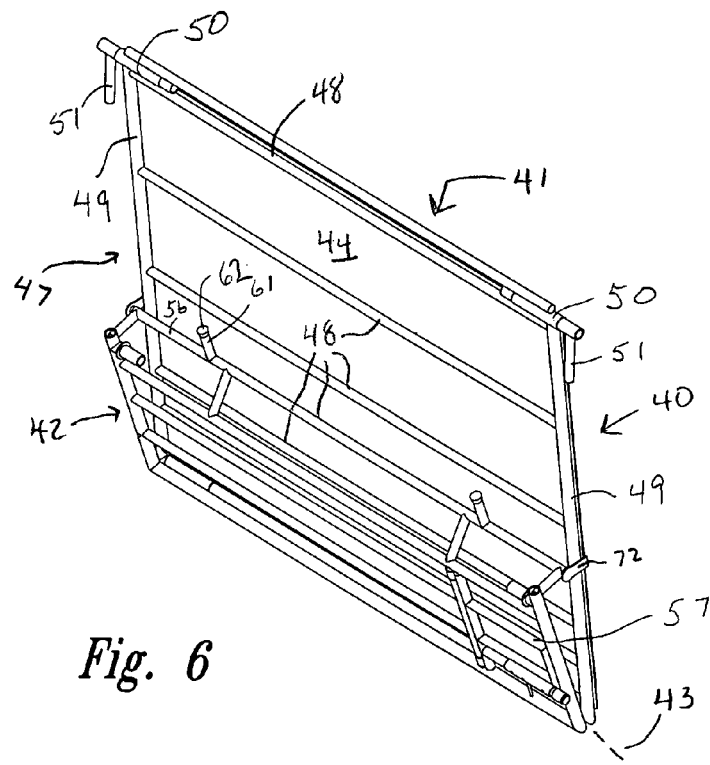
*Fig. 6*

TRUCK BED ENCLOSURE

FIELD OF THE INVENTION

The present specification relates to reconfigurable enclosures for mounting in the bed of a pickup truck, other truck type or the like.

BACKGROUND

One advantage of open trucks such as pickup trucks is that the bed is readily accessible for loading and unloading of loads, cargo, pets and the like. Cargos may include, without limitation tools, instruments, materials, purchases and the like that may be valuable or that others may desire to remove from the truck bed. Protection against such removal is offered by bed covers, that may be referred to as tonneau covers, or by canopies. These solutions, however, may limit or restrict the use of the truck in one manner or other. For example, if a fifth wheel mount is installed in the bed of the truck, a canopy or tonneau cover will have to be removed or raised in order to mount a fifth wheel trailer on the fifth wheel mount. Cargo that extends above the level of the bed, such as, for example, an appliance such as a refrigerator, or other such bulky load, may likewise not be readily loadable without removal of the bed cover or canopy.

Cargo boxes mountable in the truck bed may be used to secure articles against removal from the truck bed. These may be mounted on the gunwales of the truck bed behind the cab of the truck. Tools, instruments, purchases and other items may be secured in the box, but space may be limited, and removal of the box for handling outsized cargo may require removal and storage of the box. Kennels or cages may be mounted in the truck bed or mounted to the gunwales of the truck bed for transportation of animals, and may likewise limit the use of the truck bed.

Transportation of animals raises another set of issues. For example, many dogs and other animals enjoy riding in the bed of a pickup. However, this may not be safe unless they are in some manner secured because the animal may be thrown from, or fall from, the bed if the truck maneuvers sharply, traverses sufficiently sharp terrain irregularities, suffers an impact or otherwise. Furthermore, if the animal is left in the bed when the vehicle is parked, the animal may present a danger to passersby, may exit the truck bed and wander off, or, particularly in the case of prize animals, such as show dogs, hunting dogs and working dogs, may be stolen from the bed of the truck. Finally, the bed of the truck does not offer protection to the animal from sun, rain and snow.

BRIEF DESCRIPTION OF THE DRAWINGS

FIG. 5A is an isometric view of a portion of the truck bed enclosure in its folded position with the locking arm in its locking position;

FIG. 5B is an isometric view of a portion of the truck bed enclosure in its folded position with parts broken away and with the locking arm in its locking position;

FIG. 6 is an isometric view of a portion of the truck bed enclosure in its folded position from the reverse side as compared to FIG. 5A with the locking arm in its locking position;

DETAILED DESCRIPTION

Figure 1:
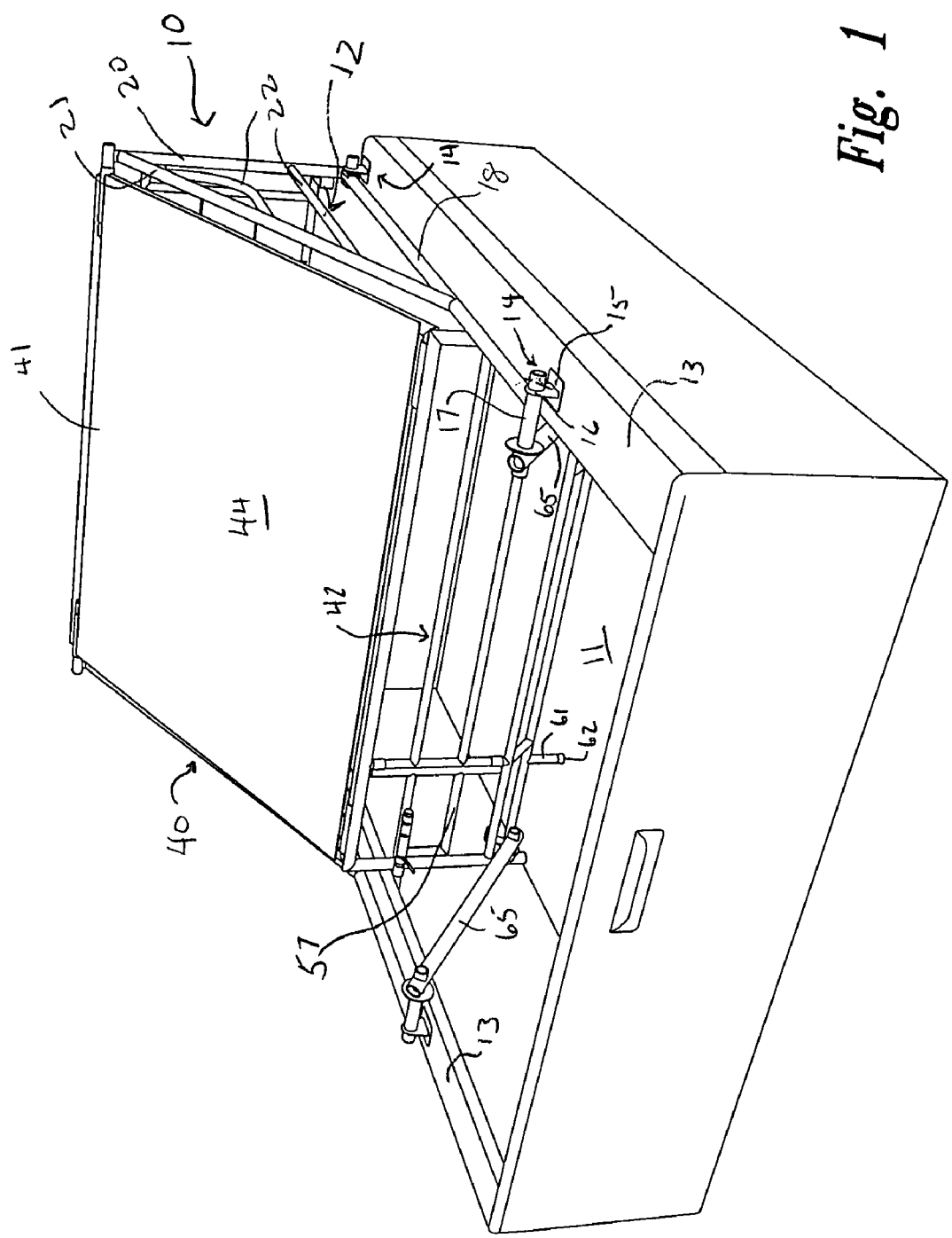
FIG. 1 is an isometric view of a truck bed enclosure mounted to a stylized truck bed.
Figure 2:
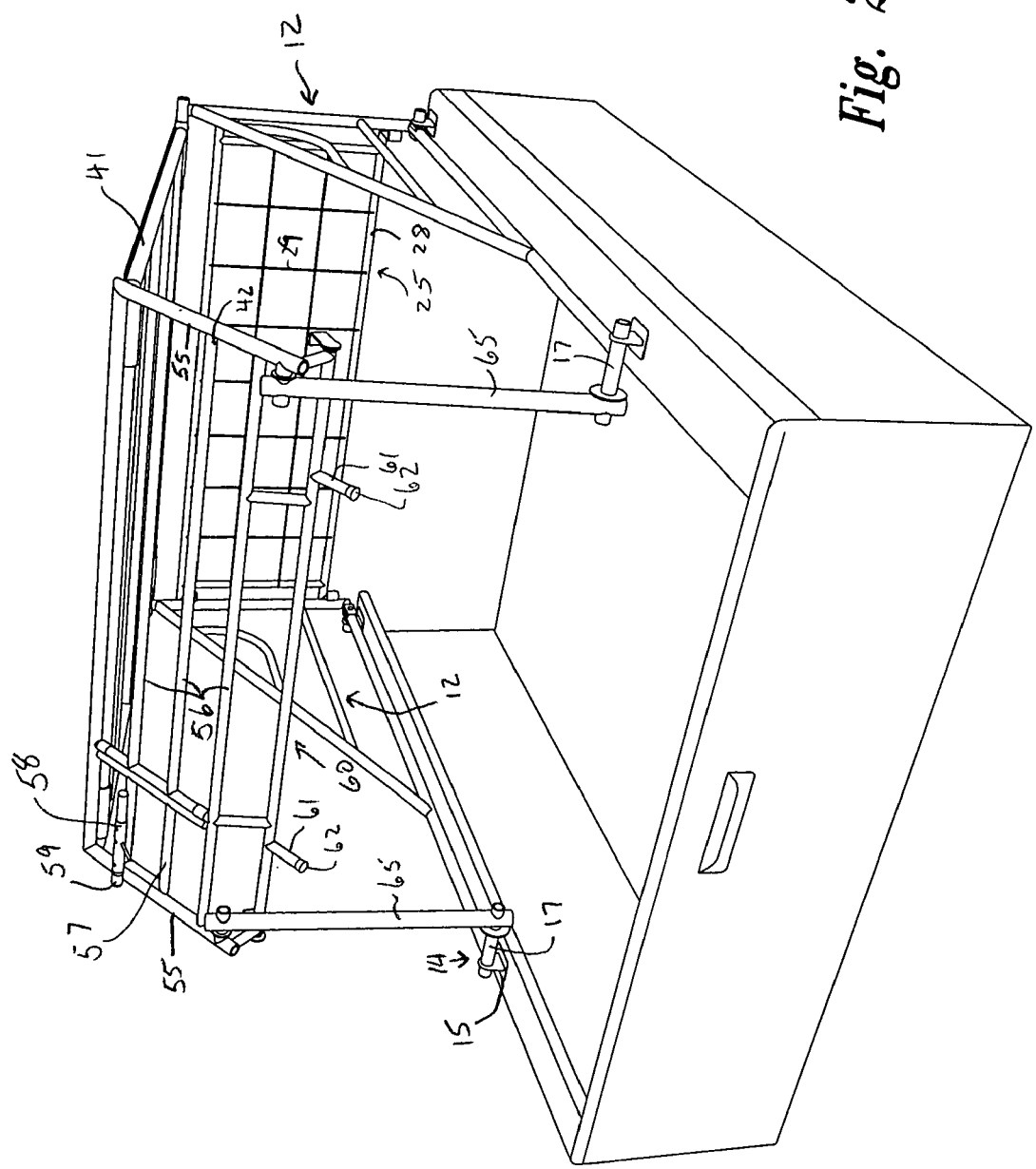
FIG. 2 is an isometric view of a truck bed enclosure mounted to a stylized truck bed with the enclosure in its fully-raised position.

In one embodiment, a truck bed enclosure 10 of the type shown in FIG. 1 may provide a secure enclosure for carrying animals, tools, instruments, packages and other articles in the bed 11 of a truck. According to this embodiment, and referring particularly to FIGS. 1 and 4, side panels 12 may be mounted to the gunwales 13 of the bed 11 of the truck by gunwale mounts 14 that are themselves mounted in apertures in the gunwales 13 of the truck bed 11.

The gunwale mounts 14 may be secured in the apertures in the gunwales by pins or locks extending transversely therethrough at a level beneath the gunwales. The gunwale mounts 14 include a flange 15 that prevents them from sliding down through and out of the apertures in the gunwales 13. An annulus 16 or other aperture may be formed in the gunwale mount 14 above the flange 15 for mounting the truck bed enclosure 10. In the present embodiment, the annulus 16 forms a circular aperture, but it will be appreciated that the aperture could be of other shapes as desired, or the enclosure 10 could be fastened, for example, by bolts to the gunwale mounts 14.

The side panels 12 are supported relative to the gunwales 13 of the truck bed 11 by horizontal mounting tubes 17 that are oriented transversely to the gunwales 13 and may be removably extended through the annuli 16 of the gunwale mounts 14. While metal tubing is used for the mounting tubes 17 in the present embodiment, the mounting tubes may be solid or tubular, and may be of round, square, rectangular, triangular or other cross section that may conform to or be sized to fit through the annulus 16. The mounting tubes 17 may be retained in the annuli by clevis pins, cotter pins, hitch pins, bolts or other removable means extended transversely through the mounting tubes 17 outboard of the annuli 16, or the mounting tubes may be threaded and held in place by nuts. The mounting tubes 17 might even be formed integrally with or bolted to the gunwale mounts 14, or some other means such as bolts and nuts might be found to fasten the mounting tubes 17 to the truck bed, if desired.

The side panels comprise base rails 18 that in the present embodiment may be connected as by welding, bonding, forming, fasteners or the like to the mounting tubes 17. When the side panels 12 are mounted on the gunwale mounts 14, the base rails 18 of the side panels 12 are raised above and extend parallel to the gunwales 14 of the truck bed 11.

The side panels 12 of the present embodiment have an enclosure section formed of members, including a vertical rail 20, an inclined rail 21 and various tubular bars 22. The vertical tube 20 is connected to the base rail 18 at one end and is connected to the end of the inclined tube 21 at its other end. The other end of the inclined tube 21 may be attached to the base rail 18 intermediate its ends. The bars 22 may be mounted and configured such that they fill the area bounded by the vertical rail 20, inclined rail 21 and base rail 18 (the side panel enclosure area 23) sufficiently to prevent the passage or removal of an animal or article therethrough. In other embodiments, wire mesh, expanded metal, panels of various materials such as fiberglass, plywood, polymer material and/ or thermoplastic material might be used to provide sufficient enclosure to prevent the animals or articles from passing through the side panel enclosure area 23. While the rails of the present embodiment may be made of round tubular steel, and may be welded, bolted, brazed, bonded or otherwise fastened together, the side panel may be made of any suitable material of sufficient strength and rigidity by any of a variety of methods.

In the present embodiment, a stabilizer panel 25 is removably mountable between the vertical rails 20 of the side panels to connect and support them relative to one another. In the present embodiment, the panel comprises a rectangular frame 28 with its open area filled with a wire mesh 29. The frame 28 may be made of rectangular metal tube welded together or may be of other construction, and the frame 28 may be alternately filled with metal tubing or other materials as desired. As the positioning of the stabilizer panel may be proximate to the rear window of the cab of a truck, and as many pickup trucks and the like have a rear window that includes a section that may be opened by sliding it laterally, the present embodiment employs wire mesh that can prevent the passage of animals or articles through the panel 25 even if such a truck cab rear window is opened. The wire mesh 29 or the like filling the frame 28 may also restrain articles in the truck bed from shifting so as to impact the rear window of the truck cab while allowing the driver to see out of the rear window using the rear view mirror.

In another embodiment, a securable door (not shown) may be provided in the stabilizer panel that, when opened, and when an openable section of the rear window of the cab of a truck is opened, may allow an animal or article to pass between the truck bed enclosure and the cab of the truck.

The stabilizer frame may be provided with fastening means for securing it between the vertical tubes 20 of the side panels 12. In the present embodiment, vertical, downwardly-extending pins 31 are mounted at the corners of the frames, and tubular members 32 are fastened to the tubular vertical rails 20 of the side panels 12 in positions to receive these pins 31 when the stabilizing panel 25 is mounted in place between the side panels 12. Of course, other fastening means known in the art could be used to fasten the stabilizing panel 25 in place between the side panels. Bolts and other fasteners, locks, latches and other such means could be employed.

Figure 3:
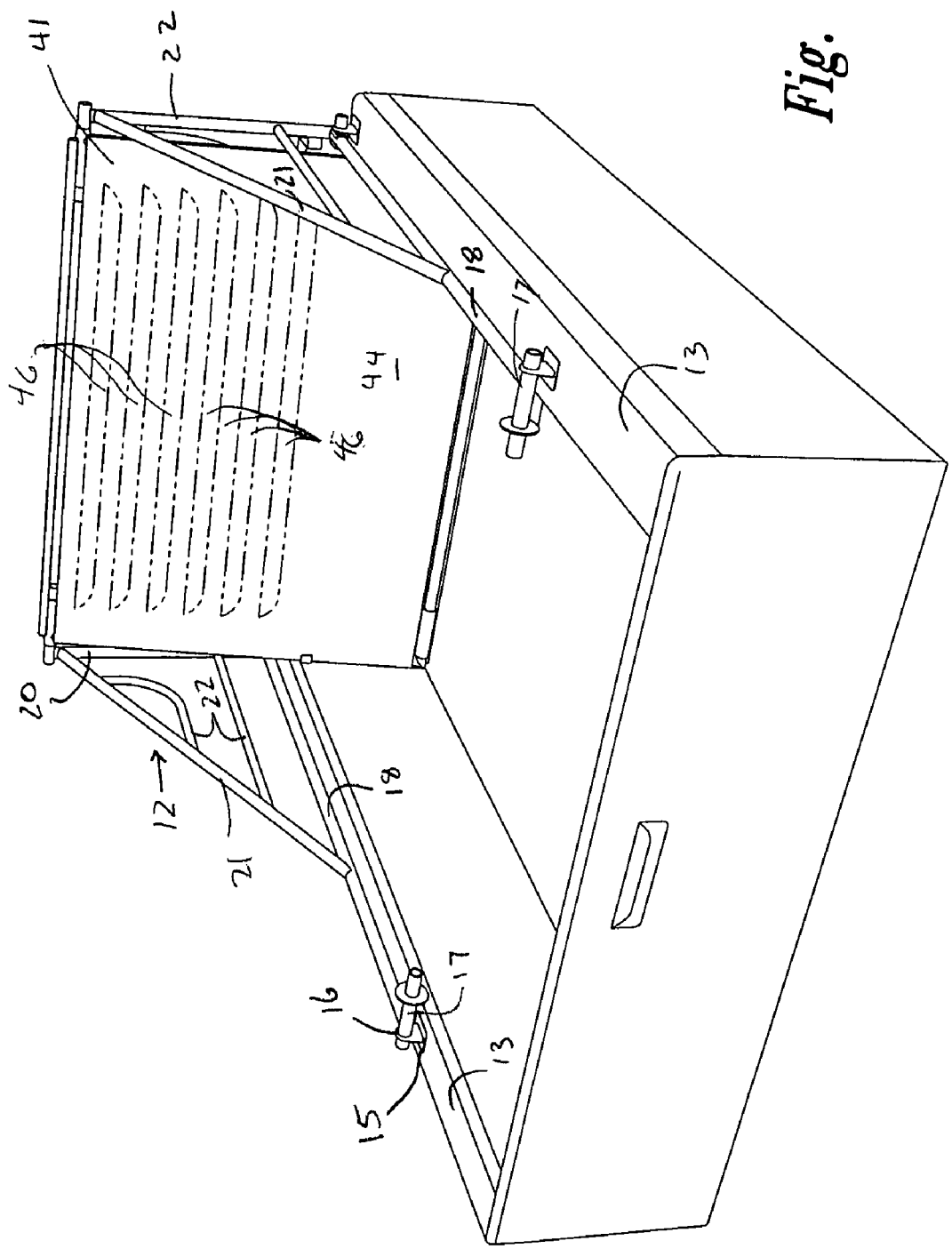
FIG. 3 is an isometric view of a truck bed enclosure mounted to a stylized truck bed with the enclosure folded against the cab end of the bed.

Referring to FIGS. 4-7, the top 40 of the enclosure 10 of the present embodiment may be formed of upper and lower panels 41, 42 that are hinged together along a horizontal hinge line 43. Although the upper panel might be formed merely of a frame with expanded metal, wire mesh or the like interior to the frame, in the present embodiment the upper and lower panels 41, 42 of the top 40 includes a solid cover 44 that may be made of wood, metal, plastic or thermoplastic material, composites such as fiberglass, and the like. In use, when the enclosure 10 is in its lowered position (as shown in FIG. 1, for example) the solid cover 44 provides a degree of shelter to animals or articles within the enclosure 10 from sun, rain, snow and so forth. In another embodiment, as shown in FIG. 3, a louvered section 45 may be provided in the top cover as discussed in greater detail below.

Referring particularly to FIGS. 5A and 6, in the present embodiment, the top cover 44 may be mounted to a frame 47 comprising a plurality of rigid transverse members 48 extending between two longitudinal side rails 49. As with the side panels, in the present embodiment, the transverse members 48 and longitudinal side rails 49 may be formed of metal tubing having rectangular, round or other cross-sectional form. Rails of "T," "I" or "U" shaped cross section might likewise be employed. Where the top cover is made of a material that is of sufficient strength and stiffness, the frame 47 may not be required. The top cover 44 might also be ribbed to increase its stiffness.

In the present embodiment, the upper panel 41 is pivotably connected between the side panels 12 with a hinge line extending parallel to a line extending from the apex of one side panel where the inclined and vertical rails intersect to the apex of the other side rail. To this end, in the present embodiment, hinges 50 may be mounted to the frame 47 at the upper corners of the upper panel 41 such that the hinge line is parallel to the upper, transverse edge of the frame 47. Mounting pins 51 may be supported by the hinges outboard of the frame 47 such that they may be swung through an arc in a plane perpendicular to the upper edge of the frame 47. In the present embodiment, the mounting pins 51 may be of a size, cross section and length and be positioned relative to the frame 46 such that, where the vertical rails 20 of the side panels 12 are of tubular material, the mounting pins may be slid into the vertical rails 20 so that the upper panel 41 is hingedly mounted between the side panels 12 adjacent the apexes of the side panels. Holes through the mounting pins 51 and vertical rails 20 may be formed such that the mounting pins 51 may be held in place by clevises, bolts, hitch pins, cotter pins, padlocks, or other fasteners or fastening means.

As previously discussed, and with reference to FIGS. 1-8, the lower panel 42 of the top 40 of the enclosure may be hinged along a transverse axis 43 to the upper panel 41. The lower panel of the present embodiment may be formed in like manner to the frame 46 of the upper panel 41 of vertical and horizontal tubular members 55, 56 that are connected together, as by welding, bonding, fasteners, forming, swaging, or other means. Similarly, in other embodiments, the panel could be formed of plastics, thermoplastics, composites or other materials. In any case, apertures in the panel should be limited to sizes that will retain animals or articles to be stored from passing therethrough, as with the enclosure portions of the side panels 12.

A door 57 may be provided in the lower panel 42 of the top 40 of the enclosure 12. A slide bolt 58 may be used to secure the door 57 in a closed position. The slide 59 of the slide bolt 58 may be positioned on the door 57 and configured such that, when the enclosure 10 is in its lowered position, as shown particularly in FIGS. 1 and 7B, the slide 59 may be extended beneath the truck bed gunwale 14 to prevent raising of the top 40 of the enclosure 10 relative to the truck bed 11. In this position of the slide 59, the door is secured in a closed position. The slide may also be positioned to secure the door in its closed position without the slide 59 extending under the gunwale 14, and to allow the door to be opened. The position of the slide 59 may be secured with clevises, hitch pins, cotter pins, bolts, locks or other means as desired. Legs 61 may be provided on the lower panel 42 to support the lower edge 60 of the panel 42 a short distance above the truck bed 10. Rubber feet 62 may be provided at the lower end of the legs.

Figure 7A:
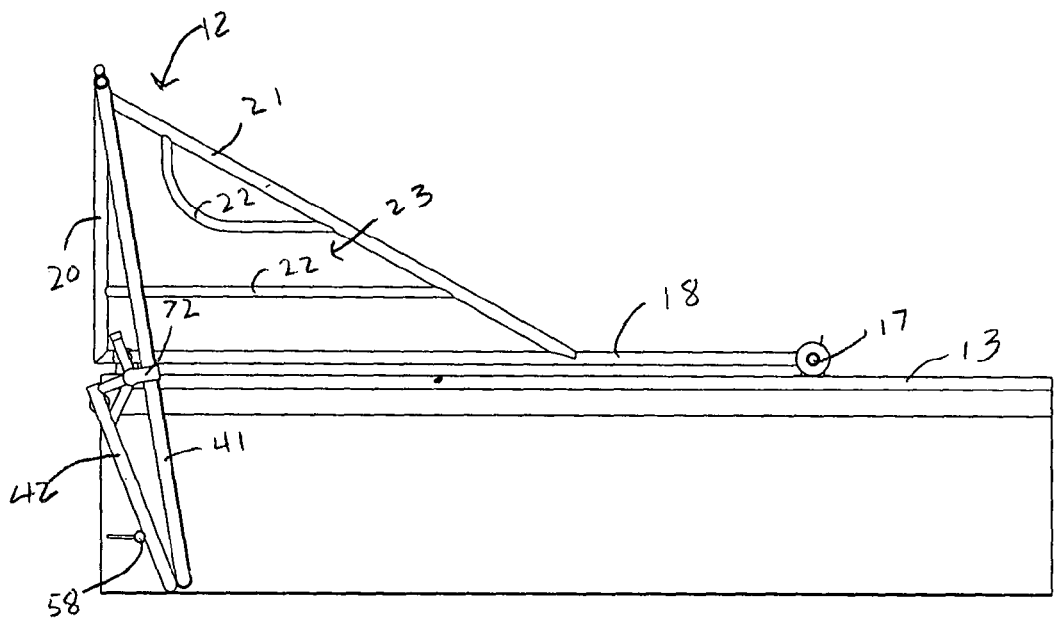
FIGS. 7A to 7C are side elevational views of the truck bed enclosure in the folded, lowered and intermediate position with the truck bed partially broken away.
Figure 7B:
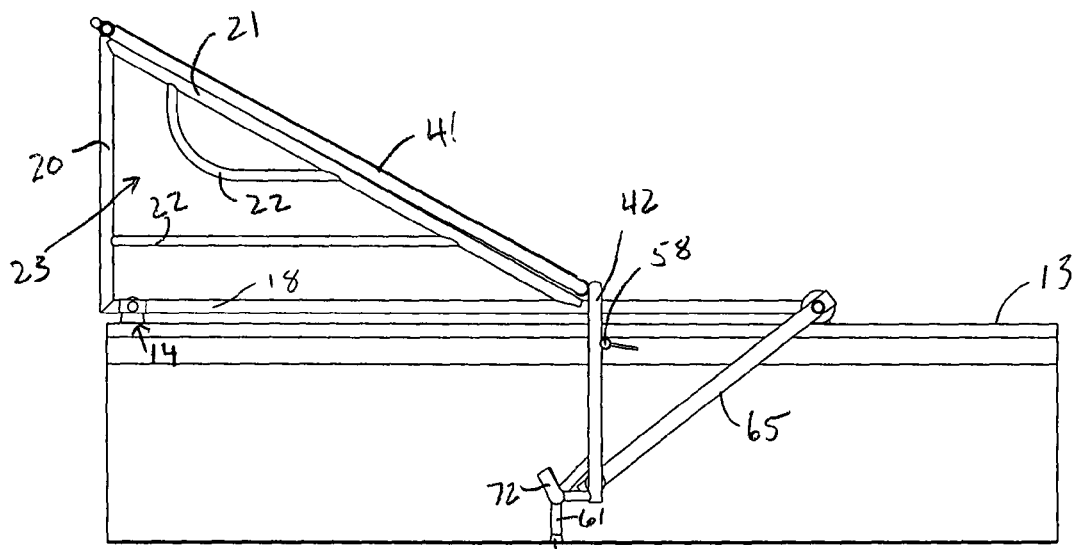
Figure 7C:
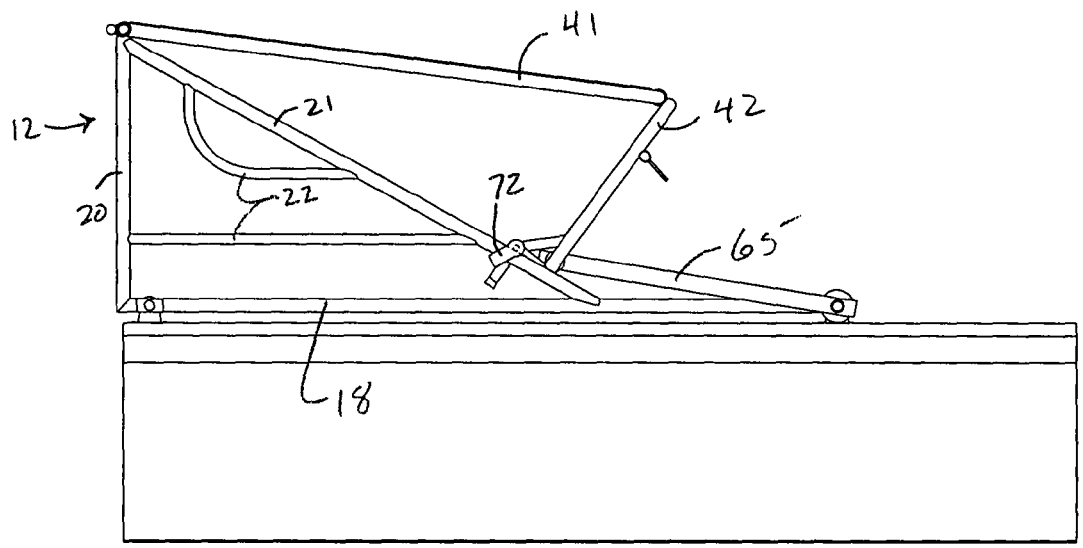
Figure 7D:
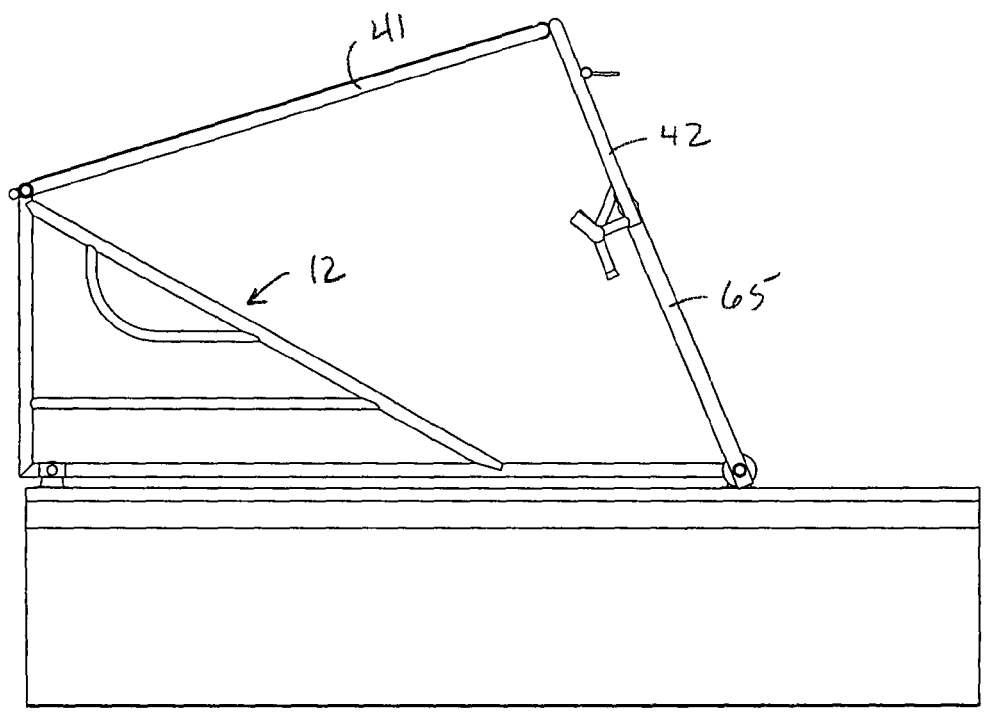
FIG. 7D is a side elevation of the enclosure in a transitional position between the intermediate position and the fully-raised position.
Figure 7E:
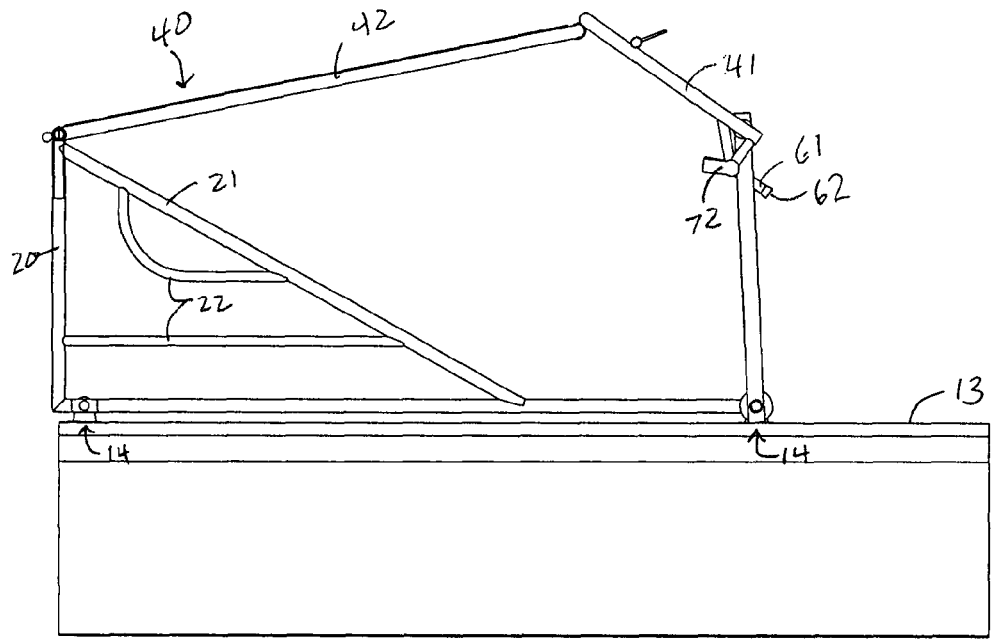
FIG. 7E is a side elevation of the enclosure in the fully-raised position.
Figure 8:
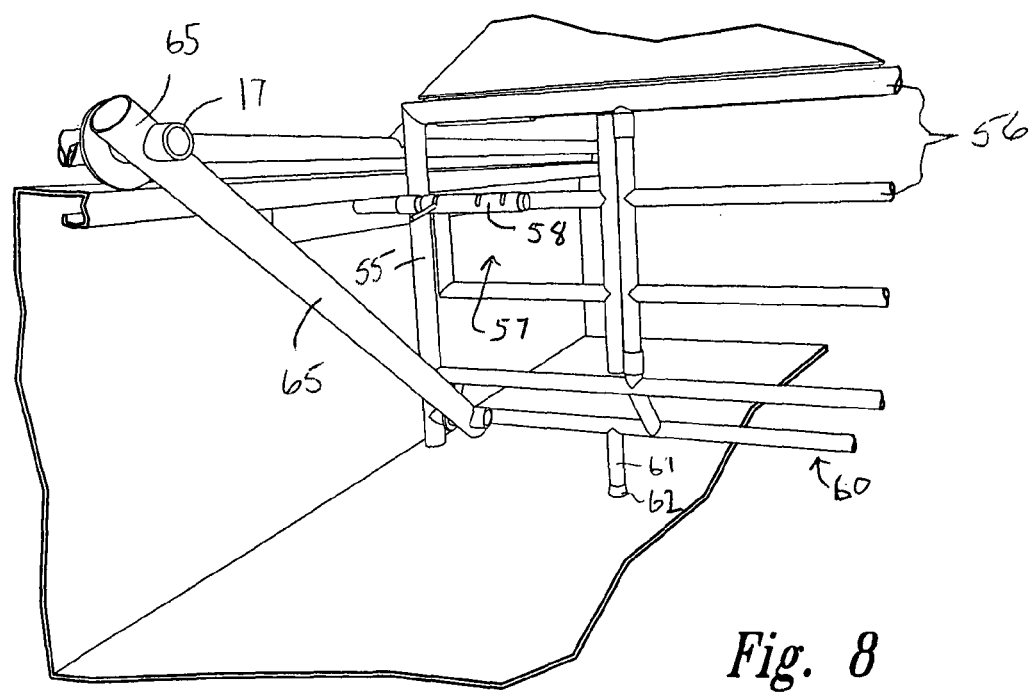
FIG. 8 is an isometric view of the enclosure in its lowered position with parts broken away.

Referring to FIGS. 1-8, and in particular to FIG. 8, the position of the lower edge 60 of the lower panel 42 is controlled by control arms 65 that, in the present embodiment, are connected between a position adjacent the lower edge 60 of the lower panel 42 at one end and the mounting tubes 17 at the other end. The end of the control arm 65 that is connected to the mounting tube 17 of the present embodiment is pivotably mounted thereto such that the control arm 65 can swing in a horizontal plane perpendicular to the mounting tube 17 and parallel to the base rail 18 of the adjacent side panel 12. The other end of the control arm 65 is pivotably mounted adjacent the lower edge 60 of the lower panel 42. The control arms 65 may be retained on the mounting tubes 17 and on the tubes adjacent the lower edge 60 of the lower panel 42 in the present embodiment by pins, bolts, locks or other means.

Figure 4:
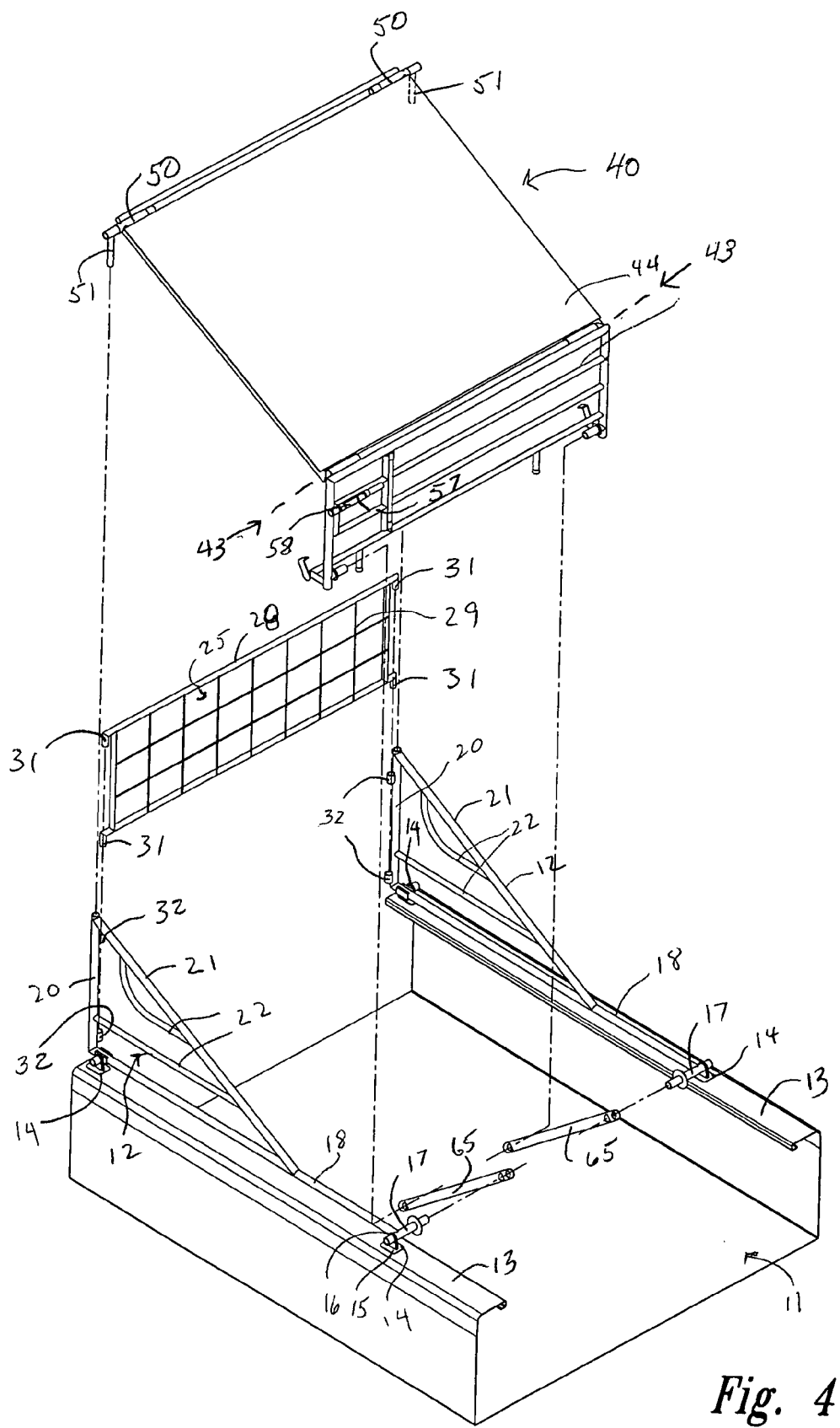
FIG. 4 is an exploded view of the truck bed enclosure.

Referring to FIGS. 4 to 5B, the lower panel 42 includes slide catches 70 that may be slid into and out of a lower horizontal tubular member 56 of the lower panel. The tubular portion (not shown) of the slide catch 70 is of a size and dimension that it slides easily into and out of the tubular member 56 in which it is positioned. A plurality of holes extending through the associated tubular member 56 at appropriate positions and a corresponding transverse hole through the tubular portion of the slide catch 70 may be provided. Pins, locks, bolts or other fasteners may be extended through selected ones of the holes through the tubular member 56 and the hole or holes in the tubular portion of the slide catch 70 through the tubular portion of the slide catch 70 to maintain the slide catch in extended and retracted positions as desired.

The slide catch 70 may include a head 71 that may comprise an arm portion 72 and a tab 73 that is mounted at the distal end of the arm 72 at right angles to the arm 71. When the slide catches 70 are in a retracted position, as shown in FIGS. 4, 5A and 7A, the heads 71 of the slide catches 70 may pass inboard of the side panels 12 to allow the top 40 of the enclosure 10 to be folded down adjacent the cab of the truck in the stowed position shown in FIG. 7A. In such case, the lower panel 42 of the top 40 of the enclosure 10 may be folded up behind the upper panel 41, the slide catch 70 may be extended and the head of the slide catch may be rotated such that, when the slide catch 70 is moved to its retracted position, the tab 73 of the slide catch engages the upper surface of the upper panel 41 to retain the lower panel 41 in its folded position relative to the upper panel 42 as shown in FIG. 6. Pins or other fasteners may be used to secure the slide catch 70 in this position. This position may be useful when the top 40 is positioned in its stowed position as shown in FIG. 7A, or when the top 40 is being transported or stored. Positioning the top 40 of the enclosure 10 may be accomplished by disconnecting the control arms 65 from either or both of the mounting tubes 17 and the tube at the lower edge 60 of the lower panel 42 of the top 40 of the enclosure 10.

The slide catches 70 may also be used to secure the lower panel 41 to the side panels 12 of the enclosure when the top 40 of the enclosure is in its intermediate position as shown in FIG. 7C. This may be accomplished by raising the top 40 so that the control arms 65 cause the lower edge 60 of the lower panel 42 to be positioned above the upper surface of the side panels 12. With the slide catches 70 in an extended position, the top 40 may then be lowered until the tubular portions of the slide catches 70 rest on the side panels 12, or, more particularly in accordance with the present embodiment, on the inclined rails 21 of the side panels 12. The heads 71 of the slide catches 70 may then be oriented such that, when the slide catches 70 are slid inwardly relative to the lower panel 42, the tabs 73 on the distal ends of the arms 72 extend beneath the inclined rails 21 of the side panels 12, as shown in FIG. 7C. The slide catch 70 may then be secured in place by pins or other fasteners.

The enclosure 10 of the present embodiment may be positioned in a variety of positions. These include the stowed position of FIGS. 3 and 7A (see also FIGS. 5A, 5B and 6), the lowered position of FIGS. 1 and 7B (see also FIGS. 4 and 8), the intermediate opened position of FIG. 7C and the fully raised or opened position of FIGS. 2 and 7E. In the stowed position, the top 40 is stowed adjacent the cab, and the bed 11 of the truck is left generally free for filling with tall or long articles, for attachment of a trailer to a fifth wheel mount and otherwise for use much as if the enclosure 10 were not mounted on the truck. While a user may install the enclosure 10 on the truck with the top 40 in any of its positions, it may be convenient to install it in the stowed position as described below. If the cover 44 of the upper panel 41 of the top 40 has louvers 46, as shown in FIG. 3, these may be opened to allow viewing behind the truck from the cab.

The lowered position of the top 40 provides an enclosure that may contain articles and/or animals. The enclosure may be locked in this position by extending the slide catch 70 beneath the gunwale 14 proximate to the door 57. In the lowered position, the control arms 65 maintain the vertical orientation of the lower panel 42 of the top 40 of the enclosure. In this position, in the present embodiment, the solid from which animals and articles cannot be removed. In this position, the upper panel is held at an incline that may, as illustrated with respect to the present embodiment, correspond to the angle of inclination of the inclined rails 21 of the side panels 12, and the sides of the upper panel 41 may thus be in close proximity to the upper edge of the side panels 12. The solid or louvered cover 44 of the upper panel 41 (if the louvers are closed) thus provides protection for the contents of the enclosure from rain, snow sunlight and the like. The door 57 may be opened and closed to allow the passage of animals and/or articles into and out of the enclosure 10.

The top 40 of the enclosure 10 may be moved from the lowered position to the intermediate position by withdrawing the slide bolt 58 from beneath the gunwale 14 of the truck bed and raising the top 40 until the slide catches 70 may be extended to rest on the side panels 12 as described above. In this position, the full bed of the truck may be used for hauling, for example, of long articles such as dimensional lumber. This position, and the fully opened position of the enclosure 10 of the present embodiment may also be convenient for loading into or unloading from the enclosure area of animals or articles secured beneath the enclosure 10 when the top 40 is in the lowered position. In this position, the upper panel 41 may be relatively horizontal providing clear vision for the driver under the upper panel 41.

The top 40 may be moved to the fully raised position by raising the upper panel 40 to the transitional position shown in FIG. 7D and then pulling the lower edge of the lower panel 42 forward until its lower horizontal tubular member 56 rests against the control arms 65. The weight of the upper and lower panels biases the lower edge of the lower panel 42 into contact with the control arms 65. In this position, the upper panel 41 of the top 40 may be inclined upwardly and rearwardly from a position adjacent the roof line of the cab of the truck, and may deflect air upward and over a trailer. This position may be useful for attaching and hauling fifth wheel trailers and the like, as well as for carrying of taller articles in the bed of the truck.

The enclosure of the present embodiment may be easily stored by an individual both because the individual components of the enclosure 10 may be made for handling by a single person and because the entire enclosure may be stored and shipped in a relatively flat configuration. Additionally, the enclosure 10 may be quickly erected in the bed of a truck. In order to install the enclosure of the present embodiment, the mounting tubes 17 of the side panels may be inserted through the annuli of the gunwale mounts 14 and fastened in place. If a stabilizer panel 25 is to be used, it may then be mounted between the side panels, if desired, by inserting the pins 27 into the tubes 26 and, if desired, pinning or fastening them in place. The top 40 of the enclosure 10 may then be placed proximate to the cab of the truck, and may be lifted so that the pins 51 may be inserted into the side panels 12 and secured in place therein as desired. The top 40 may then be positioned generally in the lowered position for pivotable attachment of the control arms to the mounting tubes between the lower panel 42 and the mounting tubes 17. Removal of the enclosure 10 from the bed 11 of the truck may proceed in reverse order.

In the specification, securing of various members by means of clevises, hitch pins, cotter pins, bolts, padlocks and the like have been referred to. These are quickly releasable, convenient and inexpensive elements that may be conveniently used. Other embodiments may use other means in their place, such as ball detent fasteners, clamps, bolts controlled by locks, cable ties, electrical or electronically released locks or other fasteners known in the art, according to the desires of the user.

Many variations may also be made in the geometry and configuration of the enclosure 10. For example, rather than the control arms attaching to the mounting tubes 17 adjacent the gunwale mounts 14, a repositionable slide could be affixed to the base rail 18 of the side panel to allow adjustment for different bed sizes and different spacings of gunwale mounts. Similarly, the base rails 18 could be mounted directly to the gunwales 13 of the truck bed 11 by bolts or the like. For flat bed trucks, vertical panels could be attached to the side panels 12 of the present embodiment to support the base rails 18 above the level of the truck bed 11. Solid panels might be considered where, in the present embodiment, frames are filled with cross members.

Thus, although the present invention has been described in considerable detail with reference to certain preferred embodiments, other embodiments are possible. Therefore, the spirit or scope of the appended claims should not be limited to the description of the embodiments contained herein.

I claim:

1. A transformable truck bed enclosure suitable for transporting a live animal in a pickup truck having a cab, a bed and gunwales, comprising:
   a pair of opposing side rails for detachable securement along the gunwales of the pickup truck, said side rails including upwardly extending elements adjacent the cab of the truck and angular elements extending from the top of each upwardly extending element and terminating intermediate the ends of the side rails;
   a pair of pivotable stabilizer arms extending from the outer end of the side rails to the bottom of the vertical element, said stabilizer secured in at least three positions, extending into the bed securing the bottom of the vertical element, an intermediate position raising the cover element and an extended position raising the cover element to its uppermost position;
   a stabilizer panel removably secured between the upwardly extending elements of the side rails adjacent the cab of the truck; and
   a cover element selectively, pivotably secured to the upper ends of upwardly extending elements of the side rails and extending rearwardly thereof at an angle toward the floor of the bed of the truck, and including a vertical element, including a door, extending from the cover element to the bed of the truck.

* * * * *